United States Patent
Oyman

(10) Patent No.: US 9,980,136 B2
(45) Date of Patent: *May 22, 2018

(54) CONTENT ACCESS AUTHENTICATION FOR DYNAMIC ADAPTIVE STREAMING OVER HYPERTEXT TRANSFER PROTOCOL

(71) Applicant: INTEL IP CORPORATION, Santa Clara, CA (US)

(72) Inventor: Ozgur Oyman, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/335,307

(22) Filed: Oct. 26, 2016

(65) Prior Publication Data
US 2017/0303121 A1    Oct. 19, 2017

Related U.S. Application Data

(63) Continuation of application No. 14/487,714, filed on Sep. 16, 2014, now Pat. No. 9,497,180.
(Continued)

(51) Int. Cl.
*H04L 29/06* (2006.01)
*H04W 12/06* (2009.01)
*H04L 29/08* (2006.01)

(52) U.S. Cl.
CPC ......... *H04W 12/06* (2013.01); *H04L 63/0876* (2013.01); *H04L 65/4084* (2013.01);
(Continued)

(58) Field of Classification Search
CPC .................................................. H04L 63/0876
(Continued)

(56) References Cited

U.S. PATENT DOCUMENTS

| 8,924,582 B2* | 12/2014 | Giladi | H04L 67/108 375/240.02 |
| 2014/0019635 A1* | 1/2014 | Reznik | H04L 65/607 709/231 |
| 2014/0101445 A1* | 4/2014 | Giladi | H04L 9/0637 713/168 |

OTHER PUBLICATIONS

3GPP TR 26.938; "3rd Generation Partnership Project; Technical Specification Group Services and System Aspects; Packet-switched Streaming Service (PSS); Improved Support for Dynamic Adaptive Streaming over HTTP in 3GPP"; (Jun. 2013); 43 pages; V1.0.0, Release 12.

(Continued)

*Primary Examiner* — Longbit Chai
(74) *Attorney, Agent, or Firm* — Thorpe North & Western

(57) ABSTRACT

A technology that is operable to authenticate content access for dynamic adaptive streaming over hypertext transfer protocol (HTTP) (DASH) is disclosed. In one embodiment, a client device is configured with circuitry to communicate, to a content server, a request for a media presentation description (MPD). An MPD message is received from the content server indicating one or more content authorization elements to access content at the content server. A request for authorization of the client device to access content at the content server is communicated to an authorization server, when the client device is configured to perform the content authorization elements in the MPD message. An authorization message is received from the authorization server. A content request message requesting one or more DASH segments is communicated to the content server.

20 Claims, 10 Drawing Sheets

Related U.S. Application Data

(60) Provisional application No. 61/898,425, filed on Oct. 31, 2013, provisional application No. 61/893,792, filed on Oct. 21, 2013.

(52) U.S. Cl.
CPC ............ *H04L 65/601* (2013.01); *H04L 67/02* (2013.01); *H04L 67/42* (2013.01)

(58) Field of Classification Search
USPC .......................................................... 726/7
See application file for complete search history.

(56) References Cited

OTHER PUBLICATIONS

3GPP TS 26.247; "3$^{RD}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH)"; (Sep. 2013); 114 pages; V12.0.0, Release 12.
International Standard; "Information Technology—Dynamic adaptive streaming over HTTP (DASH)—Part 1: Media presentation description and segment formats"; ISO/IEC 23009-1:2012(E); (Jan. 5, 2012); 133 pages; STD Version 2.1c2.

\* cited by examiner

| Element or Attribute Name | Use | Description |
|---|---|---|
| *Common attributes and elements* | | |
| @startWithSAP | O | specifies the maximum playout rate as a multiple of the regular playout rate, which is supported with the same decoder profile and level requirements as the normal playout rate.<br><br>If not present on any level, the value is 1. |
| @maxPlayoutRate | O | When present and 'true', for all contained media streams, specifies that there is at least one access unit that depends on one or more other access units for decoding. When present and 'false', for any contained media stream, there is no access unit that depends on any other access unit for decoding (e.g. for video all the pictures are intra coded). If not specified on any level, there may or may not be coding dependency between access units. |
| @codingDependency | O | specifies the scan type of the source material of the video media component type. The value may be equal to one of "progressive", "interlaced" and "unknown". If not specified on any level, the scan type is "progressive". |
| @scanType | O | specifies frame-packing arrangement information of the video media component type.<br><br>When no FramePacking element is provided for a video component, frame-packing shall not used for the video media component. |
| FramePacking | 0 ... N | specifies the audio channel configuration of the audio media component type. |
| AudioChannelConfiguration | 0 ... N | specifies information about content protection schemes used for the associated Representations. |
| ContentProtection | 0 ... N | specifies information about content access authorization schemes used for the associated Representations |
| ContentAuthorization | 0 ... N | specifies information about content access authorization schemes used for the associated Representations |

FIG. 2

```
300
<xs:complexType name="RepresentationBaseType">
  <xs:sequence>
    <xs:element name="FramePacking" type="DescriptorType" minOccurs="0" maxOccurs="unbounded"/>
    <xs:element name="AudioChannelConfiguration" type="DescriptorType" minOccurs="0" maxOccurs="unbounded"/>
    <xs:element name="ContentProtection" type="DescriptorType" minOccurs="0" maxOccurs="unbounded"/>
    <xs:element name="ContentAuthorization" type="DescriptorType" minOccurs="0" maxOccurs="unbounded"/>
    <xs:any namespace="##other" processContents="lax" minOccurs="0" maxOccurs="unbounded"/>
  </xs:sequence>
  <xs:attribute name="profiles" type="xs:string"/>
  <xs:attribute name="width" type="xs:unsignedInt"/>
  <xs:attribute name="height" type="xs:unsignedInt"/>
  <xs:attribute name="sar" type="RatioType"/>
  <xs:attribute name="frameRate" type="FrameRateType"/>
  <xs:attribute name="audioSamplingRate" type="xs:string"/>
  <xs:attribute name="mimeType" type="xs:string"/>
  <xs:attribute name="segmentProfiles" type="xs:string"/>
  <xs:attribute name="codecs" type="xs:string"/>
  <xs:attribute name="maximumSAPPeriod" type="xs:double"/>
  <xs:attribute name="startWithSAP" type="SAPType"/>
  <xs:attribute name="maxPlayoutRate" type="xs:double"/>
  <xs:attribute name="codingDependency" type="xs:boolean"/>
  <xs:attribute name="scanType" type="VideoScanType"/>
  <xs:anyAttribute namespace="##other" processContents="lax"/>
</xs:complexType>

<!-- Stream Access Point type enumeration -->
<xs:simpleType name="SAPType">
  <xs:restriction base="xs:unsignedInt">
    <xs:minInclusive value="0"/>
    <xs:maxInclusive value="6"/>
  </xs:restriction>
</xs:simpleType>

<!-- Video Scan type enumeration -->
<xs:simpleType name="VideoScanType">
  <xs:restriction base="xs:string">
    <xs:enumeration value="progressive"/>
    <xs:enumeration value="interlaced"/>
    <xs:enumeration value="unknown"/>
  </xs:restriction>
</xs:simpleType>
```

FIG. 3

CONTENT ACCESS AUTHENTICATION FOR DYNAMIC ADAPTIVE STREAMING OVER HYPERTEXT TRANSFER PROTOCOL

RELATED APPLICATIONS

This application is a continuation of U.S. patent application Ser. No. 14/487,714 filed Sep. 16, 2014 which claims the benefit of and hereby incorporates by reference U.S. Provisional Patent Application Ser. No. 61/893,792, filed Oct. 21, 2013, and U.S. Provisional Patent Application Ser. No. 61/898,425, filed Oct. 31, 2013.

BACKGROUND

Digital multimedia capabilities can be incorporated into a variety of devices, such as televisions, broadcast systems, computers, tablet devices, smartphones, digital cameras, gaming devices, and teleconferencing devices. Multimedia content providers can implement compression and encoding techniques to communicate the digital multimedia data with the devices. When the digital multimedia data has been encoded, the digital multimedia data may be packetized for transmission or storage. The content provider can packetize digital multimedia data to communicate the digital multimedia data using a variety of schemes, such as transmission over a computer network or via an Internet connection using multimedia streaming.

In one example, the devices can communicate digital multimedia data, such as streaming video, using hypertext transfer protocol (HTTP) streaming. The HTTP streaming based delivery of the multimedia streaming can include dynamic adaptive streaming over HTTP (DASH). DASH is an adaptive bitrate streaming technique for streaming multimedia content over the Internet. A device using DASH can divide or breakdown the digital multimedia content into a sequence of small HTTP-based segments each containing a portion of the multimedia content. In one example, each segment can contain a short interval of video streaming data for video streaming and playback.

A content provider can use DASH to formats content into segments, fragments, representations, adaptations, and/or elements along with associated metadata such as media presentation description (MPD) files. The content provider can provide the DASH formatted multimedia content to devices via a content server. As the digital multimedia content is streamed to a device (e.g. a DASH client), the DASH client can select from one or more alternative next segments to download and play back based on communication network conditions. For example, the DASH client can select a segment with a highest bit rate available that can be downloaded or streamed for playback without causing stalls or rebuffering events in the playback. As a content provider communicates the DASH-formatted digital multimedia content to device, the content provider needs to verify the device or user of the device receiving the digital multimedia content is authorized to receive the digital multimedia content.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 depicts a table of elements and attributes of a media presentation description (MPD) message in accordance with an example;

FIG. 3 illustrates a table of extensible markup language-syntax (XML-syntax) of common group and representation of attributes and elements in accordance with an example;

Figure 1:
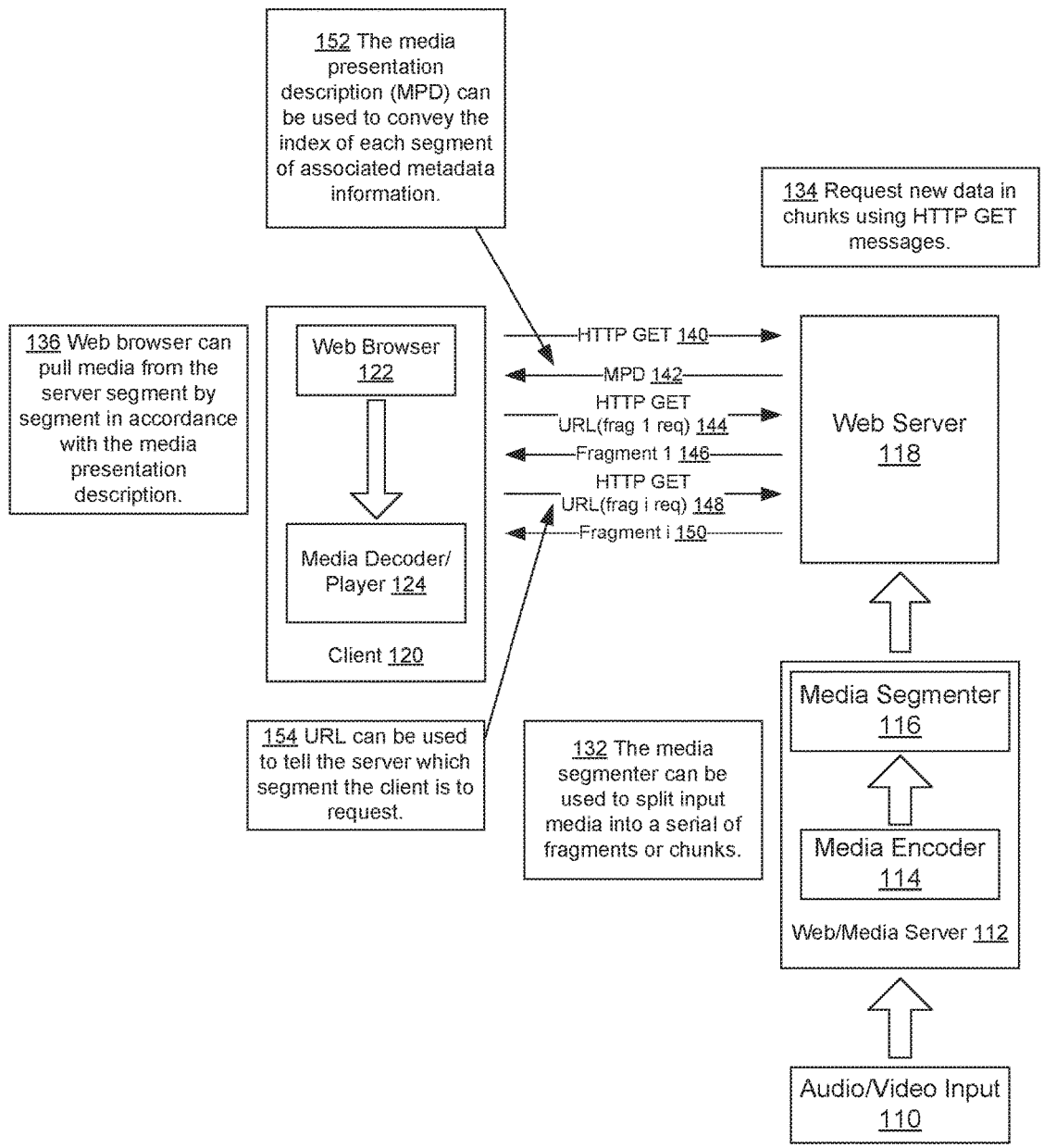
FIG. 1 illustrates a block diagram at a client and servers for dynamic adaptive streaming over hypertext transfer protocol (HTTP) (DASH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Hypertext transfer protocol (HTTP) streaming can be used as a form of multimedia content delivery of Internet video. In HTTP streaming, a multimedia content file can be partitioned into one or more segments and delivered to a client using the HTTP protocol. One advantage of HTTP-based content delivery of multimedia content is a reliability of the delivery scheme and a simplicity of deploying the delivery mechanism due to a broad adoption of both HTTP and HTTP's underlying protocols, including transmission control protocol/internet protocol (TCP/IP). Another advantage of HTTP-based content delivery is to provide streaming services that avoid network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

In one embodiment, dynamic adaptive streaming over HTTP (DASH) can be a HTTP streaming protocol. In DASH, a media presentation description (MPD) metadata file can provide information on a structure and/or versions of media content representations stored in the server including different bitrates, frame rates, resolutions, or codec types. In addition, the MPD metadata file can also indicate segment formats. The MPD metadata file can contain information on the initialization and media segments for a media player to ensure mapping of segments into a media presentation timeline for switching and synchronous presentation with other representations. In one example, the media player can analyze an initialization segment to determine a container format and media timing information of the media segment. Based on the MPD metadata information that indicates the relation of the segments in forming a media presentation, clients (or client devices) can request the segments using HTTP GET or partial GET methods. The client can fully control the streaming session. For example, the client can manage an on-time request and smooth playback of a sequence of segments and adjusting bitrates or other attributes (e.g. react to changes of the device state or the user preferences).

A DASH client can receive multimedia content by downloading the segments through a series of HTTP request-response transactions. DASH can enable dynamically switching between different bit rate representations of media content as the available bandwidth changes. Thus, DASH can allow for fast adaptation to changing network and wireless link conditions, user preferences and device capabilities, such as display resolution, the type of central processing unit (CPU) employed, or memory resources available, and so forth.

FIG. 1 illustrates a DASH-based streaming framework. A media encoder 114 in the web/media server 112 can encode an input media from an audio/video input 110 into a format for storage or streaming. A media segmenter 116 can be used to split the input media into a series of fragments or chunks 132, which can be provided to a web server 118. The client 120 can request new data in chunks using HTTP GET messages 134 sent to the web server (e.g., HTTP server).

For example, a web browser 122 of the client 120 can request multimedia content using a HTTP GET message 140. The web server 118 can provide the client with a MPD 142 for the multimedia content. The MPD can be used to convey an index of each segment and the segment's corresponding locations, as shown in the associated metadata information 152. The web browser can pull media from the server segment by segment in accordance with the MPD 142 as shown in 136. For instance, the web browser can request a first fragment using a HTTP GET URL (frag 1 req) 144. A uniform resource locator (URL) or universal resource locator can be used to tell the web server which segment the client is to request 154. The web server can provide a first fragment (i.e., fragment 1 146). For subsequent fragments, the web browser can request a fragment i using a HTTP GET URL(frag i req) 148, where i is an integer index of the fragment. As a result, the web server can provide a fragment i 150. The fragments can be presented to the client via a media decoder/player 124.

In DASH, a media presentation description (MPD) metadata file can provide information on a structure and different versions of media content representations stored in a web/media server 112, as illustrated in FIG. 1. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 120 can request the segments using an HTTP GET 140 message or a series of partial GET messages. The client can control the streaming session, such as managing an on-time request and smooth play out of a sequence of segments, or potentially adjusting bitrates or other attributes, to react to changes of a device state or a user preference.

DASH can include a segment authentication framework for verifying an origin of content and authenticating content using digital signatures or digests for all DASH segment types. In one embodiment, digital signatures or digests can be provided for media segments and sub-segments, an initialization phase, an index, or bitstream switching segments. In another embodiment, the segment authentication framework can calculate a digital signature or a digest of an unencrypted segment and store the value externally.

An MPD interface can provide URL templates for a DASH client to retrieve the digital signatures or digests using HTTP or HTTPS. When the DASH client has retrieved the digital signatures or digests using the HTTP or HTTPS, the DASH client can also locally calculate the digital signatures or digests for unencrypting a segment and/or a sub-segment. In one embodiment, the DASH client can compare the local digital signatures or digests with the retrieved digital signatures or digests and determine when the local digital signatures or digests match the retrieved digital signatures or digests. In another embodiment, when the local digital signatures or digests match the retrieved digital signatures or digests, the DASH client can access the segments or sub-segments. In another embodiment, when the local digital signatures or digests do not match the retrieved digital signatures or digests, the DASH client can reject the segments or sub-segments.

In one embodiment, segment authentication can be used independent of any content protection schemes. In another embodiment, segment authentication can be used on unencrypted segments or on encrypted segments, such as segments encrypted using a digital rights management (DRM) system. In one example, the MPD can include a Content-Digest element that provides a template for constructing a URL used for downloading a digest for a selected segment or sub-segment. In another example, the MPD can include a ContentSignature element to provide a URL for key acquisition and a template for constructing a URL. In another example, the URL can be used for downloading a signature for a selected segment or sub-segment. In another example, the MPD can include a ContentAuthentication descriptor to declare an authentication framework and communicate the digest and signature URLs. In another example, a SHA-256 digest can be used for content authentication and can be identified by a URN urn:mpeg:dash:sea:sha256. In another example, a HMAC-SHA1 signature can be used for content authentication and can be identified by an urn:mpeg:dash:sea:hmac-sha1.

To protect content copyright and satisfy licensing obligations, content and service providers may restrict access to content and limit viewing times. Client authentication can be used to control access by a user or a group of users to a specific resource or selected content of a content server. In one example, authentication keys for certain types of restricted material, such as copyrighted material or pay-per-view content, may only be distributed to authorized users. In another example, authentication keys for content with selected rating information (such as G, PG, PG-13, or R rated movies) may only be distributed to authorized users, e.g. used for parental control of the content. In one embodiment, a client-specific authentication key can be delivered to selected users and only the selected users with the correct authentication key information can access the content.

In one embodiment, a DASH player can have selected modes that enable and/or restrict playing of DASH content identified by one or more authentication keys. In another embodiment, a client-specific authentication key can be inserted as a parameter within an access URL by a service platform. In one example, the client-specific authentication key can be verified by a delivery server or content server before providing content. In another example, client-specific URLs can be generated when a DASH client inserts various parameters in a query portion of one or more media segment URLs. In another example, authentication keys used to generate media segment URLs from MPD URLs can be communicated to DASH clients using the MPD. In one embodiment, authorization and/or authentication protocol information and initialization parameters, such as authorization server URLs, can be provided to the DASH client to initiate authorization and/or authentication procedures.

In one embodiment, client authentication can be used to determine that selected users or clients are following selected procedures to access and/or use content. In another embodiment, DASH can be an open platform. In another embodiment, a content provider or an advertiser with advertisements inserted into content of a content provider may desire to restrict delivery of content to trusted content players or clients that will perform selected actions, such as content players that will display the advertisements. In one example, generic or hacked applications can identify and skip advertisements, e.g. server inserted ads can be identified and skipped using similar or the same methods as broadcast systems use for inserting advertisements. In one configuration, client authentication can be used to verify selected actions of clients (e.g. client behavior), such as the client not skipping advertisements in content accessed by the client. In another configuration, digital rights management (DRM) schemes can be used to authenticate or verify the selected actions are performed. In another configuration, client authentication can be used to authenticate or verify the selected actions are performed when DRM schemes are not used. In another configuration, client authentication can be used in combination with DRM schemes to authenticate or verify the selected actions are performed. Traditionally, when DRM schemes are not used, access to content can be restricted based on an authorization level of a client, but the content protection is limited. In one example, traditionally with no DRM scheme, while actions of a selected content application (e.g. a content player) can be verified, when content is downloaded from a content server there is no protection for the downloaded content. In this example, the client performing selected actions, such as no skipping inserted commercials, cannot be verified.

In one embodiment, when a service provider authenticates the client requesting to access selected content, the service provider can authorize playback of the content by delivering a key or token to download and/or decrypt content segments. In another embodiment, only trusted clients that have the decryption key(s) provided by the service provider are authorized to decrypt and play the selected content.

In one example of authentication of selected activities of a client, an operator may desire to deliver ad supported television content to DASH clients that are trusted to play ads according to activity rules. In one embodiment, the activity rules can include not skipping advertisements using a fast forward mode for advertisements that have not been previously played. In this example, to access the content, a DASH client can request an MPD that includes authentication information for authenticating a DASH player. In one embodiment, an authentication server can use server specific information or application specific information to identify DASH players that conform to the selected advertisement playback criteria or activity. The authentication server can then communicate a token for the DASH player to append to segment URLs to authorize requests at a content delivery network (CDN). In one embodiment, the token can be delivered from the server as a cookie or a query fragment on a redirect URL.

In one example of a content access authorization scheme, a user can have a DASH-capable client application that allows the user to watch DASH-formatted content. In this example, the user can be subscribed to mobile streaming service of a content provider that includes selected content, such as movies or television shows, in DASH format. An operator or service provider can restrict access for a movie on a content server of the operator or the service provider to authorized users to using an authentication scheme. When the user is subscribed to the mobile streaming service, the DASH-capable client application can be authenticated and the user can access the movie.

In another example of a content access authorization scheme, a first user and a second user can each have DASH-capable client applications that enable the first user and the second user to access and view DASH-formatted content. In this example, both the first user and the second user are subscribed to a mobile streaming service. In one embodiment, the first user is subscribed to a premium streaming plan and the second user is subscribed to a basic streaming plan. In one configuration, the mobile streaming service can be configured to provide DASH formatted content at different bitrates and/or different resolution levels based on selected criteria, such as a subscription level of a user. In one embodiment, the premium streaming plan of the first user can enable the DASH-capable client applications of the first user to access and receive streams at all bitrates and resolutions levels offered by the mobile streaming service. In another embodiment, the basic streaming plan of the second user can restrict the DASH-capable client application of the second user to only access content with selected bitrates or resolutions levels.

In one configuration, the MPD can include one or more authentication and access authorization elements to access DASH content. In one embodiment, the authentication and access authorization elements can include a ContentAuthorization descriptor declared at a MPD hierarchy level of a common adaptation set, representation and sub-representation attributes and elements.

FIG. 2 depicts a table 200 of elements and attributes of an MPD message. FIG. 2 further depicts the table 200 with each element or attribute including an element or attribute name, use, and/or description. The table 200 in FIG. 2 further illustrates a use column for the elements or attributes indicating a use of the elements or attributes, including: a mandatory (M) use of the element or attribute in the MPD message, an optional (O) use of the element or attribute in the MPD message, an optional use with a default value (OD) use of the element or attribute in the MPD message, or a conditionally mandatory (CM) use of the element or attribute in the MPD message. In one embodiment, the table 200 in FIG. 2 can include a ContentAuthorization element (in bold typeface) that can be implemented in a DASH MPD. In one example, the ContentAuthorization element can include an @schemeIdUri attribute for identifying a content access authorization or trusted client authentication scheme.

In one embodiment, the @schemeIdUri attribute can provide information, to enable a client to determine whether the client is eligible for authorization to play the protected content, e.g., whether or not the client is a trusted client. In another embodiment the @schemeIdUri attribute can be used in conjunction with an @value and/or other extension attributes and elements, such as authentication system(s), content access authorization policies, and/or key distribution scheme(s). In one example, when a DASH client receives the MPD, the DASH client can use the MPD to determine when the DASH client does not meet the content access authorization or trusted client authentication requirements.

Traditionally, a DASH client can download content and then determine if the DASH client is configured to decrypt the content, e.g. determine that the DASH client does not have decryption keys to decrypt the content. In one embodiment of the present invention, when the DASH client does not meet content access authorization requirements or trusted client authentication requirements, the DASH client can ignore content on a content server, e.g. not download the content. In another embodiment, when the DASH client does meet the content access authorization requirements or trusted client authentication requirements, the DASH client can then initiate corresponding content access authorization protocols or trusted client authentication protocols to obtain the decryption keys that are necessary in order to be able to decrypt and access the content.

In one embodiment, the ContentAuthorization element can be extended in a separate namespace to provide information specific to a content access authorization scheme (e.g., particular key management systems or authentication methods). In another embodiment, when multiple ContentAuthorization elements are present, each ContentAuthorization element can describe a content access authorization scheme or trusted client authentication scheme that indicate a set of requirements for accessing and/or displaying the content. In one example, content access authorization and trusted client authentication at a MPD level can include: Open Authentication Technical Committee (OATC) Online Multimedia Authorization Protocol (OMAP), Open Standard for Authorization (OAuth) 2.0, OASIS Security Assertion Markup Language (SAML), third generation partnership project (3GPP) Generic Authentication Architecture (GAA), 3GPP Generic Bootstrapping Architecture (GBA).

FIG. 3 depicts a table 300 of extensible language-syntax (XML-syntax) protocols of common adaptation set, representation and sub-representation attributes and elements. The table 300 in FIG. 3 further shows the extensible language-syntax protocols that includes a ContentAuthorization element (as in FIG. 2) in bold typeface, as discussed in the preceding paragraphs. In one embodiment, the ContentAuthorization element can be extended in a separate namespace to provide information specific to a content access authorization scheme (e.g., particular key management systems or authentication methods). In another embodiment, when multiple ContentAuthorization elements are present, each ContentAuthorization element can describe a content access authorization scheme or trusted client authentication scheme are necessary in order to be able to access and display the content.

Figure 4:
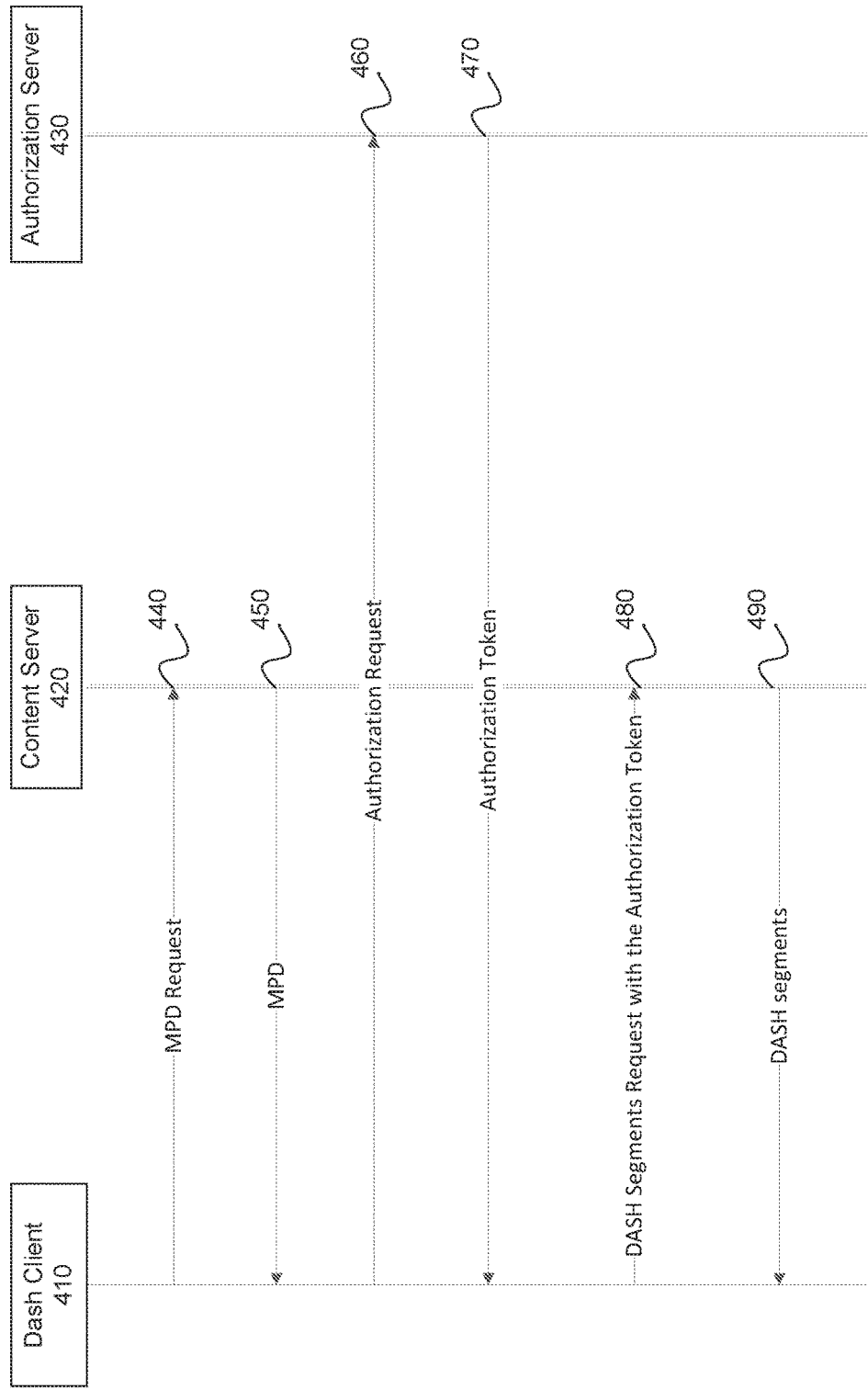
FIG. 4 shows an embodiment of a content access authorization procedure for a DASH client using an MPD in accordance with an example.

FIG. 4 shows an embodiment of a content access authorization procedure for a DASH client using an MPD. In one embodiment, the DASH client 410 can communicate a MPD request to a content server 420, as in step 440. In another embodiment, the DASH client 410 can receive an MPD from the content server 420 indicating authorization requirements for the DASH client 410 to access content on the content server 420, as in step 450. In another embodiment, the DASH client 410 can communicate an authorization request to an authorization server 430 requesting to access content on a content server, as in step 460. In another embodiment, the authorization server 430 can communicate an authorization token to the DASH client 410, as in step 470. In another embodiment, the DASH client 410 can communicate a DASH segment request with the authorization token to the content server 420 requesting selected DASH segments, as in step 480. In another embodiment, the DASH client 410 can receive selected DASH segments from the content server 420, as in step 490.

Figure 5:
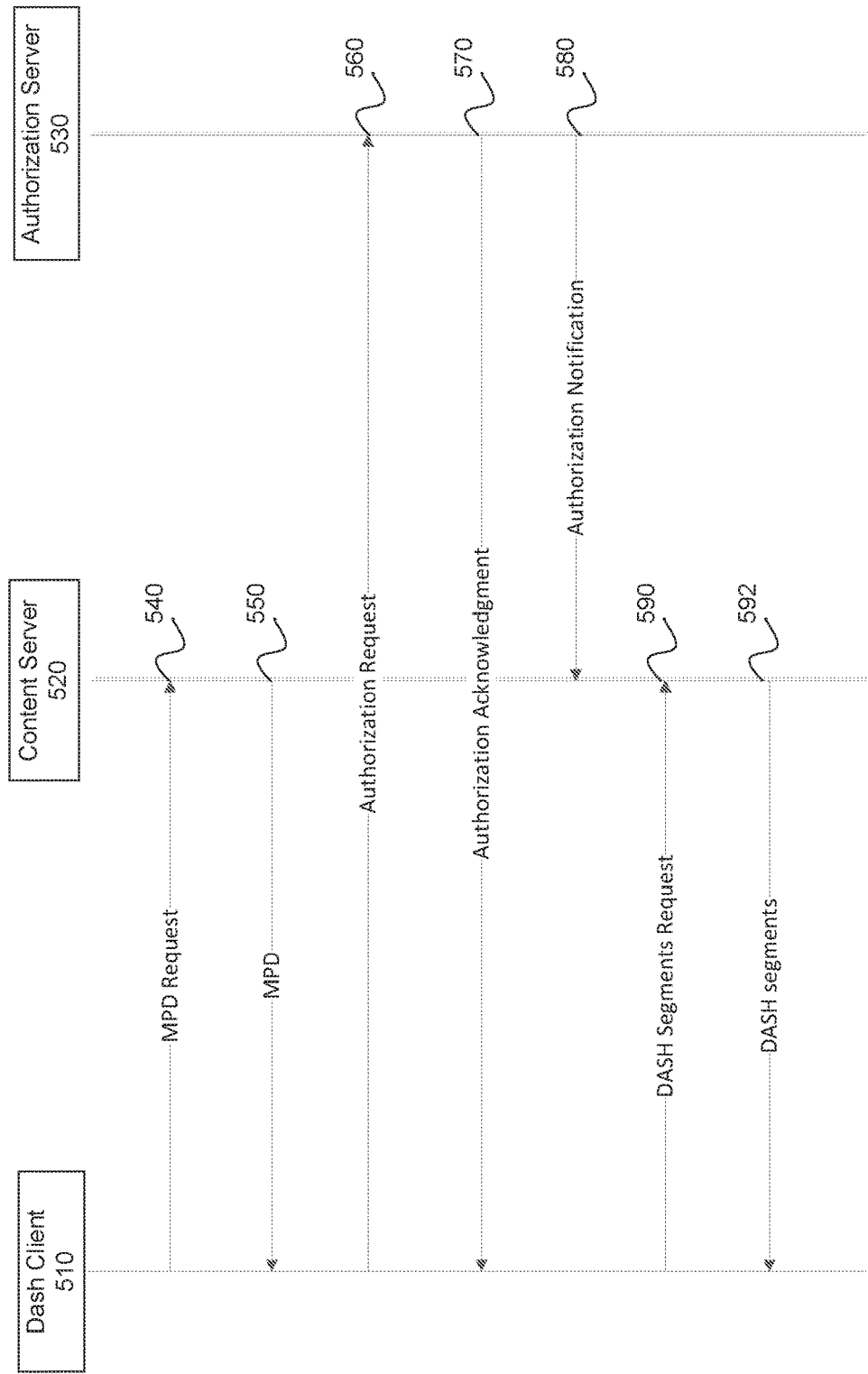
FIG. 5 shows another embodiment of a content access authorization procedure for a DASH client using an MPD in accordance with an example.

FIG. 5 shows another embodiment of a content access authorization procedure for a DASH client using an MPD. In one embodiment, the DASH client 510 can communicate a MPD request to a content server 520, as in step 540. In another embodiment, the DASH client 510 can receive an MPD from the content server 520 indicating authorization requirements for the DASH client 510 to access content on the content server 520, as in step 550. In another embodiment, the DASH client 510 can communicate an authorization request to an authorization server 530 requesting to access content on a content server, as in step 560. In another embodiment, the authorization server 530 can communicate an authorization acknowledgement to the DASH client 510, as in step 570. In another embodiment, the authorization server 530 can communicate an authorization notification to the content server 520 indicating to the content server 520 that the DASH client 510 is authorized to access selected DASH segments, as in step 580. In another embodiment, the DASH client 510 can communicate a DASH segment request to the content server 520 requesting selected DASH segments, as in step 590. In another embodiment, the DASH client 510 can receive selected DASH segments from the content server 520, as in step 592.

Figure 6:
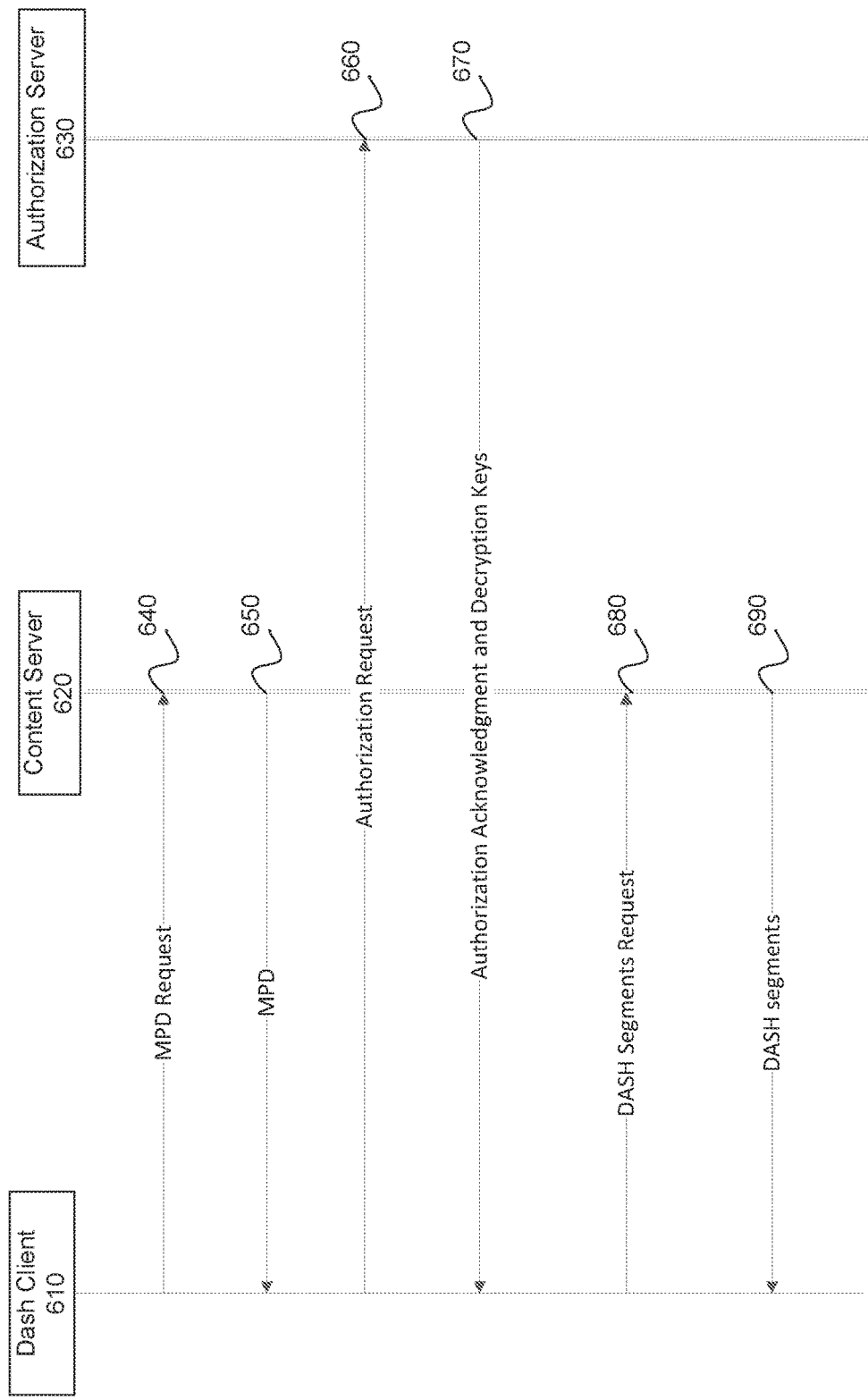
FIG. 6 shows another embodiment of a content access authorization procedure for a DASH client using an MPD in accordance with an example.

FIG. 6 shows another embodiment of a content access authorization procedure for a DASH client using an MPD. In one embodiment, the DASH client 610 can communicate a MPD request to a content server 620, as in step 640. In another embodiment, the DASH client 610 can receive an MPD from the content server 620 indicating authorization requirements for the DASH client 610 to access content on the content server 620, as in step 650. In another embodiment, the DASH client 610 can communicate an authorization request to an authorization server 630 requesting to access content on a content server, as in step 660. In another embodiment, the authorization server 630 can communicate an authorization acknowledgement and decryption keys to the DASH client 610, as in step 670. In another embodiment, the DASH client 610 can communicate a DASH segment request to the content server 620 requesting selected DASH segments, as in step 680. In another embodiment, the DASH client 610 can receive selected DASH segments from the content server 620, as in step 690.

Figure 7:
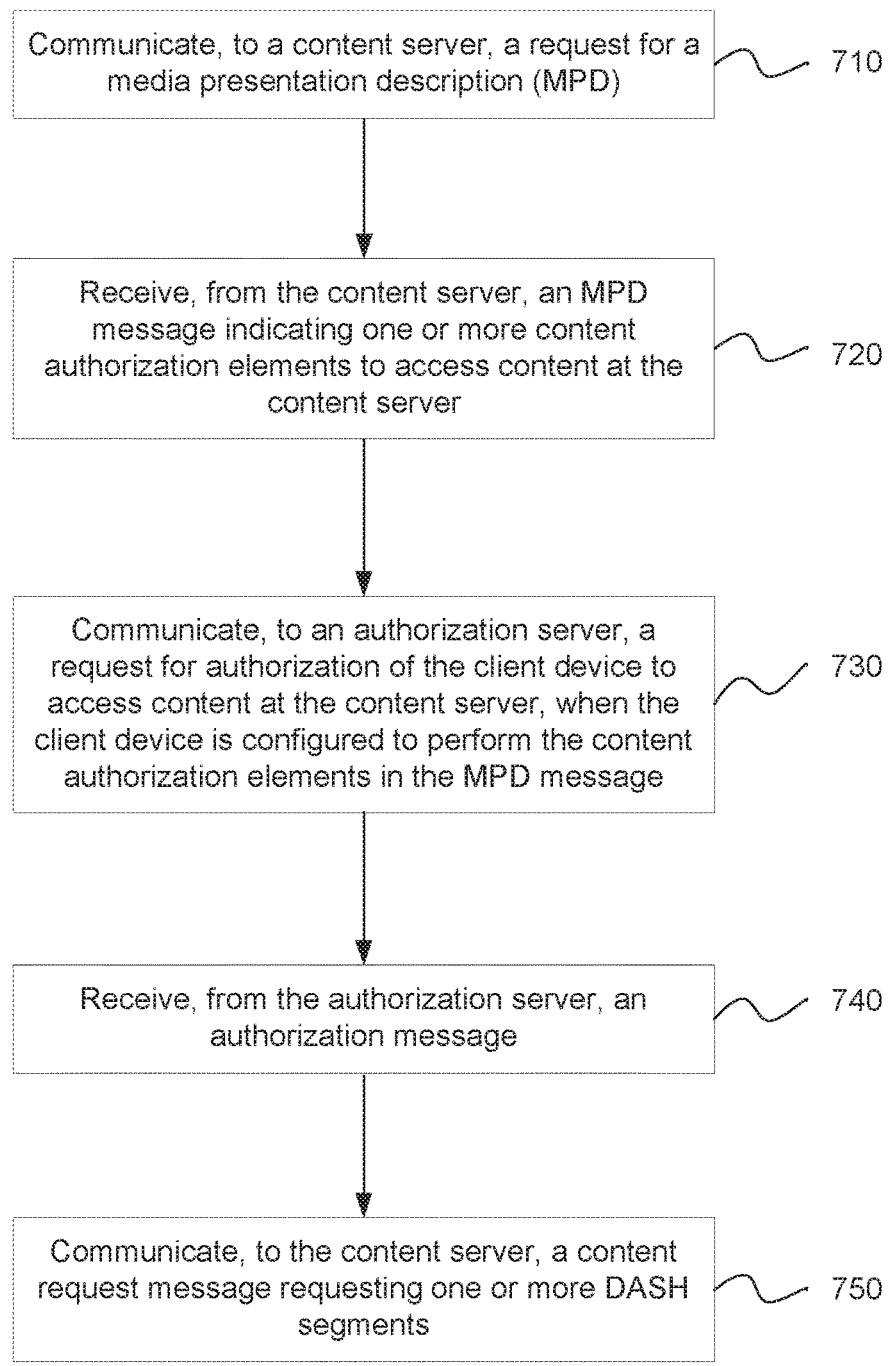
FIG. 7 depicts the functionality of circuitry of a client device operable to authenticate content access for DASH in accordance with an example.

Another example provides functionality 700 of circuitry of a client device operable to authenticate content access for dynamic adaptive streaming over hypertext transfer protocol (HTTP) (DASH), as shown in the flow chart in FIG. 7. The functionality may be implemented as a method or the functionality may be executed as instructions on a machine, where the instructions are included on at least one computer readable medium or one non-transitory machine readable storage medium. The circuitry can be configured to communicate, to a content server, a request for a media presentation description (MPD), as in block 710. The circuitry can be further configured to receive, from the content server, an MPD message indicating one or more content authorization elements to access content at the content server, as in block 720. The circuitry can be further configured to communicate, to an authorization server, a request for authorization of the client device to access content at the content server, when the client device is configured to perform the content authorization elements in the MPD message, as in block 730. The circuitry can be further configured to receive, from the authorization server, an authorization message, as in block 740. The circuitry can be further configured to communicate, to the content server, a content request message requesting one or more DASH segments, as in block 750.

In one embodiment, the circuitry can be further configured to receive, from the content server, the requested one or more DASH segments based on a content access authorization level of the client device. In another embodiment, the content request message includes information from the authorization message indicating an authorization level of the UE to access the requested one or more DASH segments. In another embodiment, the authorization message includes an authorization token for accessing selected content at the content server. In another embodiment, the content request message includes the authorization token indicating an authorization level of the client device to access content of the content server. In another embodiment, the authorization message includes a decryption key for decrypting selected content at the content server.

In one configuration, the circuitry can be further configured to receive, from the content server, the requested one or more DASH segments and decrypt the one or more DASH segments from the content server using the decryption key. In another configuration, the circuitry can be further configured to determine when the UE is authorized to access selected content at the content server using the MPD or determine when the UE is a trusted client using the MPD.

Figure 8:
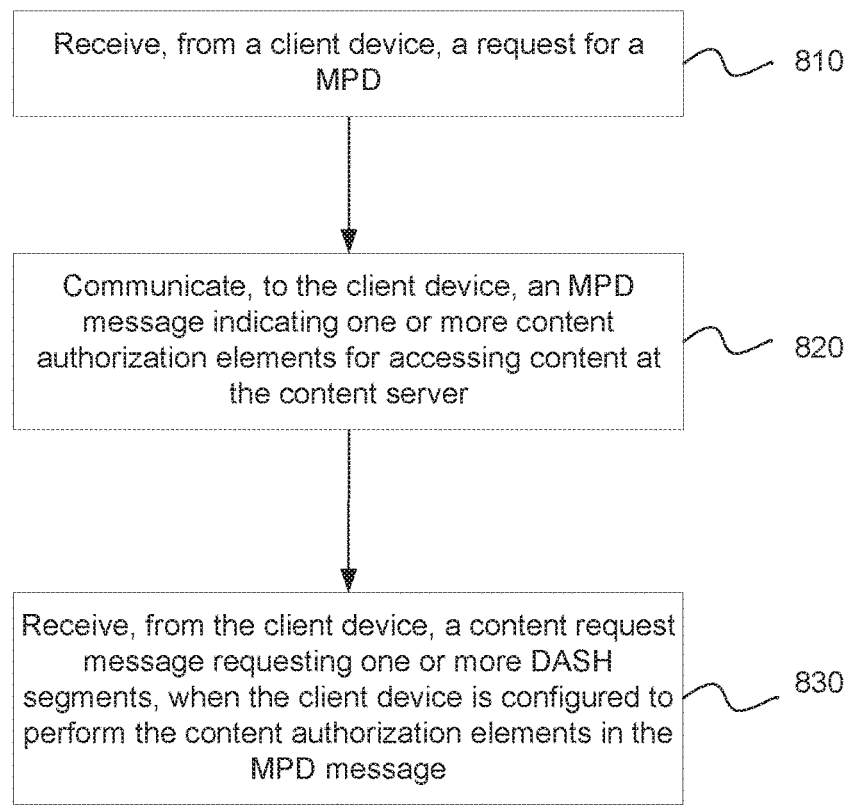
FIG. 8 depicts the functionality of circuitry of a content server operable to authenticate content access for DASH in accordance with an example.

Another example provides functionality 800 of circuitry of a content server operable to authenticate content access for dynamic adaptive streaming over hypertext transfer protocol (HTTP) (DASH), as shown in the flow chart in FIG. 8. The functionality may be implemented as a method or the functionality may be executed as instructions on a machine, where the instructions are included on at least one computer readable medium or one non-transitory machine readable storage medium. The circuitry can be configured to receive, from a client device, a request for a media presentation description (MPD), as in block 810. The circuitry can be further configured to communicate, to the client device, an MPD message indicating one or more content authorization elements for accessing content at the content server, as in block 820. The circuitry can be further configured to receive, from the client device, a content request message requesting one or more DASH segments, when the client device is configured to perform the content authorization elements in the MPD message, as in block 830.

In one configuration, the circuitry can be further configured to communicate, to the client device, the requested one or more DASH segments based on a content access authorization level of the client device. In one embodiment, the content request message includes an authorization token indicating an authorization level of the client device to access content of the content server. In another configuration, the circuitry can be further configured to receive, from an authorization server, an authorization notification indicating that the client device is authorized to access selected content at the content server. In another configuration, the circuitry can be further configured to restrict or deny access by the client device to content at the content server when an authorization notification is not received from an authorization server.

In one example, the MPD message includes information indicating a procedure for receiving authorization or authentication to access selected content at the content server. In another example, the MPD message can include initialization parameters, authorization protocol information, or authentication protocol information for initiating an authorization procedure or an authentication procedure. In another example, the initialization parameters, the authorization protocol information, or the authentication protocol information include a uniform resource locator (URL) of an authorization server to use for the procedure for authorization or authentication to access the selected content at the content server. In another example, authentication elements or access authorization elements to access DASH content are included in a descriptor of the MPD declared at: a MPD hierarchy level of a common adaptation set, representation attributes and elements, or a sub-representation attributes and elements.

Figure 9:
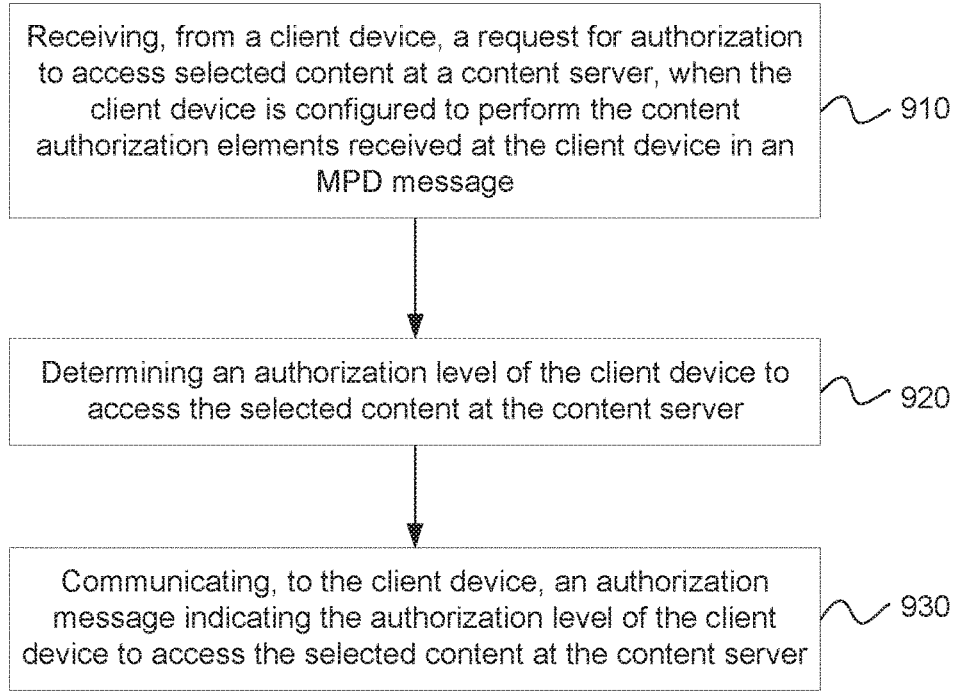
FIG. 9 depicts a product including a non-transitory storage medium having stored thereon instructions that are adapted to be executed to implement a method of authenticating content access for DASH in accordance with an example.

Another example provides functionality 900 of product including a non-transitory storage medium having stored thereon instructions that are adapted to be executed to implement a method of authenticating content access for dynamic adaptive streaming over hypertext transfer protocol (HTTP) (DASH), as in the flow chart in FIG. 9. The instructions of the product can be implemented as a method or as instructions on a machine, where the instructions are included on at least one computer readable medium or one non-transitory machine readable storage medium. The method can comprise receiving, from a client device, a request for authorization to access selected content at a content server, when the client device is configured to perform the content authorization elements received at the client device in an MPD message, as in block 910. The method can further comprise determining an authorization level of the client device to access the selected content at the content server, as in block 920. The method can further comprise communicating, to the client device, an authorization message indicating the authorization level of the client device to access the selected content at the content server, as in block 930.

In one embodiment, the method can further comprise communicating, to the content server, an authorization notification indicating an authorization level of the client device to access the selected content at the content server. In another embodiment, the authorization message includes a decryption key for the client device to decrypt selected content received from the content server. In another embodiment, the method can further comprise determining that the client device is a trusted client device.

In another embodiment, the method can further comprise determining the authorization level of the client device to access the selected content using: open authentication technical committee (OATC) online multimedia authorization protocol (OMAP); open standard for authorization (OAuth) 2.0; organization for the advancement of structured information standards (OASIS) Security Assertion Markup Language (SAML); third generation partnership project (3GPP) generic authentication architecture (GAA); or 3GPP generic bootstrapping architecture (GBA).

Figure 10:
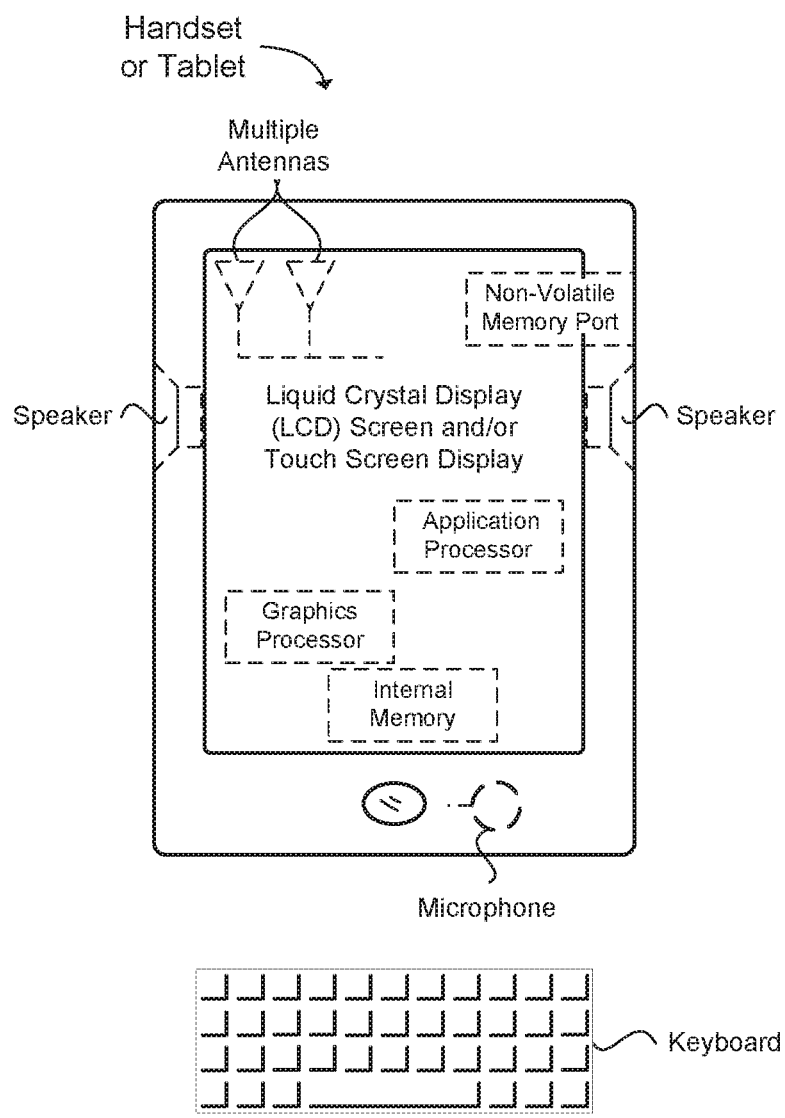
FIG. 10 illustrates a diagram of a UE in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a client operable to access HTTP DASH (dynamic adaptive streaming over hypertext transfer protocol) content from a content server, the client comprising one or more hardware processors and memory configured to:
    signal, by the client, a first message for transmission to the content server, wherein the first message includes a request for a media presentation description (MPD) file from the content server;
    decode, at the client, an MPD file received from the content server, wherein the MPD file includes:
    a client authentication value for authenticating the client; and
    a content access authorization value for authorizing access by the client to selected DASH content from the content server;
    execute, at the client, a client authentication protocol indicated by the client authentication value and a content access authorization protocol indicated by the content access authorization value to determine that the client is authorized to access the selected DASH content at the content server and is a trusted client using the MPD file based on a received authorization message; and
    signal, at the client, a second message for transmission to the content server, wherein the second message includes a request for the selected DASH content from the content server, when the client is successfully authenticated as an authenticated player and authorized to play back the selected DASH content indicated in the MPD file.

2. The apparatus of claim 1, further comprising a transceiver configured to:
    transmit, to the server, the first message that includes the request for the MPD file;
    receive the MPD file from the server; and
    transmit, to the server, the second message that includes the request for content from the server.

3. The apparatus of claim 1, wherein the one or more processors and memory are further configured to decode the content received from the server for playback at the client.

4. The apparatus of claim 1, wherein the client authentication value indicates the client authentication protocol that is supported at the server.

5. The apparatus of claim 1, wherein the content access authorization value indicates the content access authorization protocol that is supported at the server.

6. The apparatus of claim 1, wherein the content accessed from the server includes dynamic adaptive streaming over hypertext transfer protocol (HTTP) (DASH) content.

7. The apparatus of claim 1, wherein the MPD file includes one or more descriptors that include the client authentication value and the content access authorization value.

8. The apparatus of claim 1, wherein the client includes an antenna, a touch sensitive display screen, a speaker, a microphone, a graphics processor, an application processor, an internal memory, or a non-volatile memory port.

9. An apparatus of a content server operable to provide access to dynamic adaptive streaming over hypertext transfer protocol (HTTP) (DASH) content, the content server comprising one or more hardware processors and memory configured to:
    decode, by the hardware processor at the content server, a request for a media presentation description (MPD) file received from a client;
    signal, at the content server, an MPD file for transmission to the client, wherein the MPD file indicates a client authentication value and a content access authorization value for authorizing access by the client to selected DASH content from the content server;
    decode, at the content server, a content request message received from the client, wherein the content request message indicates a request for the selected DASH content; and
    signal, at the server, the selected DASH content for transmission to the client when the client is successfully authenticated as an authenticated player and authorized to play back the selected DASH content indicated in the MPD file, wherein the client is configured to execute a client authentication protocol indicated by the client authentication value and a content access authorization protocol indicated by the content access authorization value to determine that the client is authorized to access the selected DASH content at the content server and is a trusted client using the MPD file based on a received authorization message.

10. The apparatus of claim 9, wherein the content request message includes a token indicating an authentication level and an authorization level of the client.

11. The apparatus of claim 9, wherein the one or more processors and memory are further configured to restrict or deny access by the client to the DASH content at the server when the client is not configured to execute the client authentication protocol indicated by the client authentication value and the content access authorization protocol indicated by the content access authorization value.

12. The apparatus of claim 9, wherein:
    the MPD file includes client authentication protocol information for initiating a client authentication procedure; and
    the MPD file includes content access authorization protocol information for initiating a content access authorization procedure.

13. The apparatus of claim 12, wherein the client authentication protocol information and the content access authorization protocol information include a uniform resource name (URN) associated with the client authentication procedure and the content access authorization procedure.

14. The apparatus of claim 9, wherein the client authentication value and the content access authorization value are included in one or more descriptors in the MPD file, and the one or more descriptors are declared at a MPD hierarchy level of a common adaptation set, representation attributes and elements, or a sub-representation attributes and elements.

15. The apparatus of claim 9, wherein the one or more processors and memory are further configured to provide the client with access to the DASH content using:
    an Open Authentication Technical Committee (OATC) Online Multimedia Authorization Protocol (OMAP);

an Open Standard for Authorization (OAuth) 2.0;
an Organization for the Advancement of Structured Information Standards (OASIS) Security Assertion Markup Language (SAML);
a Third Generation Partnership Project (3GPP) Generic Authentication Architecture (GAA); or
a 3GPP Generic Bootstrapping Architecture (GBA).

16. At least one machine non-transitory readable storage medium having instructions embodied thereon for accessing dynamic adaptive streaming over hypertext transfer protocol (HTTP) (DASH) content from a content server, the instructions when executed perform the following:

signaling, using one or more hardware processors at a client, a first message for transmission to the content server, wherein the first message includes a request for a media presentation description (MPD) file from the content server;

decoding, using the one or more hardware processors at the client, the MPD file received from the content server, wherein the MPD file indicates a client authentication value and a content access authorization value for authorizing access by the client to selected DASH content from the content server;

executing, using the one or more hardware processors at the client, a client authentication protocol indicated by the client authentication value and a content access authorization protocol indicated by the content access authorization value to determine that the client is authorized to access the selected DASH content at the content server and is a trusted client using the MPD file based on a received authorization message; and signaling, using the one or more hardware processors at the client, a second message for transmission to the content server, wherein the second message includes a request to access the selected DASH content from the content server, when the client is successfully authenticated as an authenticated player and authorized to play back the selected DASH content indicated in the MPD file.

17. The at least one machine readable storage medium of claim 16, further comprising instructions when executed perform the following: decoding the DASH content received from the server for playback at the client.

18. The at least one machine readable storage medium of claim 16, wherein the client authentication value indicates the client authentication protocol that is supported at the server.

19. The at least one machine readable storage medium of claim 16, wherein the content access authorization value indicates the content access authorization protocol that is supported at the server.

20. The at least one machine readable storage medium of claim 16, wherein the MPD file includes one or more descriptors that include the client authentication value and the content access authorization value.

* * * * *